United States Patent Office 2,989,566
Patented June 20, 1961

2,989,566
MANUFACTURE OF OXYGEN-CONTAINING ORGANIC COMPOUNDS
Donald Peter Young, Sanderstead, England, assignor, by mesne assignments, to Hercules Powder Company, a corporation of Delaware
No Drawing. Filed Feb. 20, 1956, Ser. No. 566,372
Claims priority, application Great Britain Feb. 23, 1955
5 Claims. (Cl. 260—610)

The present invention relates to the oxidation of 1:4-dialkylated tetrahydronaphthalenes and more particularly to novel and useful dihydroperoxide products produced by the oxidation process.

The ready formation of dihydroperoxide compounds from a hydrocarbon in which two alkyl substituents are linked to carbon atoms which are attached to a hydrocarbon ring such as the benzene ring in the ortho-position is quite unexpected. It was known, for instance from British Patent 646,102, that ortho-diisopropylbenzene either does not oxidise at all or to a very limited extent only. Furthermore, Hock, Depke and Knauel have stated in Ber. 83, page 238 (1950), that whereas their first attempt to prepare the hydroperoxide from 1-methyltetralin had failed completely, they attributed their failure to the impure starting material. They succeeded only when the oxidation was carried out with careful observation of special conditions. These conditions were maintaining the reaction mixture at temperatures below 60° C. and the complete absence of alkali. They also stated that the hydroperoxide is a very sensitive compound, especially towards alkali. The ease with which the 1:4-dialkyltetrahydronaphthalenes undergo autoxidation with formation of dihydroperoxides and the stability of these compounds are therefore the more surprising.

According to this invention compounds are oxidised which are 1:2:3:4-tetrahydronaphthalenes which are substituted by two straight chain alkyl groups in the completely saturated ring in the 1 and 4 positions to produce 1:4-dialkyl-1:2:3:4-tetrahydronaphthalene dihydroperoxides. Suitable 1:4-dialkylated-1:2:3:4-tetrahydronaphthalenes which may be treated in accordance with the process of the invention are for instance 1:4-dimethyl-1:2:3:4-tetrahydronaphthalene, 1:4-diethyl-1:2:3:4-tetrahydronaphthalene, 1:4-di-normal-propyl-1:2:3:4-tetrahydronaphthalene, 1:4-di-normal-butyl-1:2:3:4-tetrahydronaphthalene and 1-ethyl-4-methyl-1:2:3:4-tetrahydronaphthalene. The two alkyl groups may thus be the same or different.

The oxidation of the alkylated tetrahydronaphthalene hydrocarbon to the dihydroperoxide is carried out in the liquid phase with oxygen-containing gases conveniently at a temperature in the range of 70°–120° C., preferably between 75° and 90° C. and advantageously in the presence of an alkali such as an alkali metal hydroxide or carbonate, for instance sodium carbonate or sodium hydroxide or an oxide of the alkaline earths such as magnesium oxide. The oxygen used may be commercial oxygen, that is oxygen of 90% and higher concentration, or oxygen-containing gases such as air. Water may be present in the reaction mixture during the oxidation. When the oxidation is effected in an emulsion of the tetrahydronaphthalene in water, temperatures between 80° and 95° C. were found to be most suitable.

The oxygen is readily absorbed by the hydrocarbon, whereby the latter is converted into the corresponding hydroperoxide with good efficiency. The term "efficiency" signifies the ratio of the amount of hydrocarbon converted into hydroperoxides to that consumed. According to the length of time during which the oxygen is introduced into, or contacted wtih the hydrocarbon or the hydrocarbon-containing reaction mixture, the resulting product contains greater or lesser amounts of dihydroperoxide and some monohydroperoxide. When a 1:4-dialkyltetrahydronaphthalene is oxidised in this manner, the dihydroperoxide produced comprises two isomeric compounds, probably cis- and trans-isomers, in which the hydroperoxide groups are attached to carbon atoms in the 1 and 4 positions in the tetrahydronaphthalene nucleus and both these carbon atoms are in the ortho-position with respect to the benzene ring. Both isomers are soluble in aqueous alkali metal hydroxide such as sodium hydroxide, whilst the monohydroperoxide is not. It is, however, soluble in a solution of alkali metal hydroxide in a mixture of a lower alkanol such as methanol and water from which solution it is precipitated by the addition of further quantities of water. This last property of the solubility of the dihydroperoxide enables these compounds to be separated from the monohydroperoxides produced by extracting the oxidation reaction mixture by means of aqueous alkali metal hydroxide solution. Aqueous alkali metal hydroxide solutions of a strength between 2 and 12% by weight, preferably between 7 and 9% by weight gave satisfactory results.

The chemical properties of the isomers are the same as far as the decomposition by means of acidic catalysts and the production of catechol therefrom are concerned, but their physical properties may be different. Thus, for instance, one of the stereoisomers of 1:4-diethyl-1:2:3:4-tetrahydronaphthalene dihydroperoxide is solid, whilst the other has been obtained as a viscous liquid. Also, the solid isomer crystallises from its solutions in solvents such as chloroform and toluene as crystals which contain solvent of crytallisation.

The oxidation may be carried out in a batchwise or a continuous manner. In the latter case, it is preferred to extract the dihydroperoxides from the oxidation reaction mixture with aqueous alkali and recycle the remaining hydrocarbon with its content of monohydroperoxide to the oxidation stage.

The 1:4-dialkyl-1:2:3:4-tetrahydronaphthalene dihydroperoxides of this invention distinguish from all previous hydroperoxides not only in that they are ortho-substituted dihydroperoxides but also in their ability to be decomposed to catechol by means of acidic catalysts. With the discovery of the dihydroperoxides of this invention and that they could be decomposed with an acidic catalyst a route to the production of catechol is opened up which had not previously been available through the medium of the hydroperoxide decomposition reaction.

As acidic catalysts mineral acids such as sulphuric acid, or organic acids such as alkanesulphonic acids, may be used and the decomposition is preferably carried out with a solution of the dihydroperoxides wherein, for instance, acetone is used as a solvent. When sulphuric acid is used as decomposition catalyst in conjunction with acetone, a very small quantity of sulphuric acid is sufficient to bring about the complete decomposition when the reaction is carried out at the boiling point of the mixture. It is, however, possible to effect the decomposition at a lower temperature such as 50° C. although a longer time is required in order to complete the reaction. By the decomposition reaction, besides catechol, a diketone is produced, the chain length of which depends on the alkyl groups with which the tetrahydronaphthalene was initially substituted in the 1:4 position. For example, the 1:4-diethyltetrahydronaphthalene dihydroperoxide furnishes, besides catechol, octane-3:6-dione. In addition, and especially with dihydroperoxides derived from dialkyltetra-hydronaphthalenes contacing altogether fourteen or more carbon atoms, by-products which are diketo-phenols are obtained. For instance, 1:4-diethyltetrahydronaphthalene gives rise to 1-o-hydroxybenzolypentan-3-one in minor amounts.

The recovery of the catechol and the diketone is preferably carried out by removing the solvent, such as acetone, from the decomposition reaction mixture for instance by distillation, dissolving the residue in an organic solvent, for instance benzene or carbon tetrachloride, and extracting the resulting solution with water, preferably in a continuous manner, whereby an aqueous solution of catechol is obtained. The catechol may be recovered from the aqueous solution thus obtained in any suitable manner such as evaporation to dryness, extraction with an organic solvent essentially insoluble in water such as diethyl ether, or precipitation, for instance as the lead or barium compound. Once isolated, it may be purified by recrystallisation in the known manner. Before commencing the recovery of catechol from the decomposition mixture, it is preferred to neutralise the acid used as catalyst. This may be done, for instance, by the addition of the required quantity of sodium hydroxide or magnesium oxide.

The diketone, such as octane-3:6-dione, may be recovered from the organic layer, after it has been freed from catechol by extraction with water, and from other phenolic products by extraction with aqueous caustic alkali. This recovery may be effected for instance by evaporating the solvent and distilling or recrystallising the residue.

The decomposition of the dihydroperoxide by means of acidic catalysts may also be carried out without previously separating the dihydroperoxide from the monohydroperoxide, preferably after a major portion of the unreacted dialkyltertrahydronaphthalene hydrocarbon has been removed, for instance by distillation under reduced pressure. Since, however, this solution contains also the corresponding monohydroperoxide and this compound furnishes on reaction with acidic catalysts a keto-phenol which, in addition to the diketone mentioned above, would have to be separated subsequently from the catechol, it is preferred to subject a dihydroperoxide which is free from monohydroperoxide to the decomposition process.

The dihydroperoxides of this invention also find use as catalysts for the polymerisation and co-polymerisation of vinyl and vinylidene compounds such as butadiene-1:3 and styrene. They also may be used as catalysts for curing polyester resins, particularly modified polyester resins such as styrene modified polyesters.

The following examples describe the dihydroperoxides of this invention, their prepartion and their decomposition to catechol and diketones. In the examples, parts by weight and parts by volume bear the same relationship as kilograms to litres.

*Example 1*

A mixture of 112 parts by weight of 1:4-diethyltetrahydronaphthalene and 50 parts by weight of 2.5% aqueous sodium carbonate was vigorously agitated in a glass vessel heated to 80–90° C. while oxygen was passed through. In the course of twenty-six hours, 19 parts by weight of oxygen were absorbed, and titrations of the mixture showed that 79% of this was present in the form of hydroperoxides.

The reaction mixture was cooled to room temperature, and the organic layer was diluted with an equal volume of benzene. Some of the solid dihydroperoxide crystallised out immediately, and was removed by filtration. The aqueous phase was decanted from the filtrate and rejected, and the organic phase was extracted several times with a total of 640 parts by volume of 8% aqueous sodium hydroxide to separate the rest of the dihydroperoxide. The organic layer was next washed free from alkali and the benzene was driven off. The residue was diluted with three times its volume of light petroleum (B.P. 40–60° C.), and extracted several times with a total of 150 parts by volume of a mixture containing 30 parts by weight of sodium hydroxide and 75 parts by volume of methanol in water. On dilution with water, this extract precipitated a crude and probably mixed monohydroperoxide, which was separated and after recrystallising several times from light petroleum formed fine colourless needles, M.P. 63–64° C. The 8% sodium hydroxide extracts were treated with carbon dioxide to liberate the dihydroperoxides, and the mixture was shaken with 200 parts by volume of benzene and filtered. The crystalline residue consisted of the solid 1:4-diethyl-1:2:3:4-tetrahydronaphthalene dihydroperoxide. From the filtrate, the organic phase was separated, and after washing with water and drying the solvent benzene was driven off, leaving the impure liquid dihydroperoxide as a viscous oil. The total yields were 15 parts by weight of solid dihydroperoxide, 22 parts by weight of liquid dihydroperoxide and 50 parts by weight of monohydroperoxide. The solid dihydroperoxide could be further purified by recrystallisation from chloroform or toluene, when it formed solvated crystals in the form of colourless prisms, M.P. about 115° C.; the solvent of crystallisation was lost on standing for a few days in the atmosphere or more rapidly on heating to 78° C. in vacuo, and the solvent-free material had M.P. 120° C. This material analysed 66.9% C; 7.8% H (calculated 66.7% C; 8.0% H).

16 parts by weight of the liquid dihydroperoxide of 72% purity dissolved in 80 parts by volume of acetone, were added as rapidly as possible to a solution of 0.1 part by weight of sulphuric acid in 80 parts by volume of acetone boiling under reflux. After 40 minutes the peroxide had nearly all been consumed and the sulphuric acid was neutralised by the addition with agitation of 3 parts by weight of magnesium oxide. The solution was filtered and the acetone driven off, and the product was dissolved in 50 parts by weight of carbon tetrachloride and continuously extracted with water to remove the catechol produced. This was recovered by re-extracting the aqueous solution with ether in the usual manner, giving 3.8 parts by weight of catechol. The carbon tetrachloride solution, after being freed from phenolic by-product by washing with sodium hydroxide solution, gave 1.4 parts by weight of octane-3:6-dione, B.P. 106–112° C./25 mm., M.P. 34–36° C. Acidification of the sodium hydroxide extract liberated the tarry phenolic by-products from which, by extraction with hot light petroleum, was isolated 1-o-hydroxybenzoylpentan-3-one, M.P. 40° C. The solid dihydroperoxide was catalytically decomposed in a similar manner to give the same products.

*Example 2*

400 parts by weight of 1:4-diethyl-1:2:3:4-tetrahydronaphthalene were agitated with oxygen at 90° C. in the presence of 5 parts by weight of calcium hydroxide. After eight hours, a further 5 parts of calcium hydroxide were added to ensure that the mixture did not become acid. By the end of twelve hours, 73 parts by weight of oxygen had been absorbed and 75% of this had been combined in the form of hydroperoxides. The product was cooled, diluted with an equal volume of benzene, and filtered. The solid residue contained some dihydroperoxide, which was extracted from the residual calcium salts by leaching with acetone. The filtered oxidate was extracted with a total of 2,000 parts by volume of 8% aqueous sodium hydroxide solution, which was treated for recovery of the dihydroperoxides as in Example 1. A total of 40 parts by weight of the solid dihydroperoxide and 55 parts by weight of the liquid dihydroperoxide was obtained.

16 parts by weight of the solid dihydroperoxide (as the chloroform solvate containing 75% of dihydroperoxide) dissolved in 60 parts by volume of isobutyl methyl ketone was added to a solution of 0.12 part by weight of sulphuric acid in 60 parts by volume of acetone boiling under reflux. The hydroperoxide had all reacted within five minutes, whereupon the sulphuric acid was neutralised by agitation with magnesium oxide, and after filtering the acetone was distilled off. Part of the produced catechol could be separated by extracting the resulting solution with water. The remainder of the phenolic material was extracted from the product with 8% aqueous sodium hydroxide solution; after acidification of this, it was first washed with benzene to remove 1-o-hydroxybenzoylpentan-3-one and then with ether which extracted the remainder of the catechol. The total yield of catechol was 2.6 parts by weight. 2.9 parts by weight of octane-3:6-dione were obtained from the isobutyl methyl ketone raffinate after the alkali extraction. The liquid dihydroperoxide treated in a similar manner gave the same products.

Example 3

A mixture of 400 parts by weight of 1:4-diethyl-1:2:3:4-tetrahydronaphthalene and 100 parts by weight of 10% aqueous potassium carbonate was agitated with oxygen at 90° C. In the course of fourteen hours, 70 parts by weight of oxygen were absorbed and approximately 70% of this was present in the form of hydroperoxides. The product was worked up in a similar manner to Example 1, and yielded 45 parts by weight of the solid dihydroperoxide (as the chloroform addition product), 48 parts by weight of the liquid dihydroperoxide and a raffinate containing 211 parts by weight of the monohydroperoxide.

A solution of 6.8 parts by weight of the dried solid dihydroperoxide (92% pure) in 50 parts by volume of acetone was added as rapidly as possible to a solution of one part by volume of a mixed alkanesulphonic acid (mainly butanesulphonic) in 50 parts by volume of acetone at the boiling-point. The hydroperoxide was decomposed very rapidly, and after eight minutes the mixture was cooled and percolated through a column of alumina to remove the acid catalyst. The product was concentrated until it was free from acetone, and taken up in 25 parts by volume of benzene. Extraction of this with water gave 1.2 parts by weight of catechol. Subsequent extraction of the benzene solution with 8% aqueous sodium hydroxide removed 0.7 part by weight of 1-o-hydroxybenzoylpentan-3-one and other phenolic material, after which the raffinate yielded 1.6 parts by weight of octane-3:6-dione.

Example 4

A mixture of 247 parts by weight of 1:4-dimethyl-1:2:3:4-tetrahydronaphthalene and 60 parts by weight of 2.5% aqueous sodium carbonate was vigorously agitated in a glass vessel heated to 90° C. while oxygen was passed through. In seven hours 77 parts by weight of oxygen were absorbed, and titration showed that 80% of this was present in the form of hydroperoxides.

The reaction mixture was cooled to room temperature, and the organic layer was diluted with an equal volume of benzene. The aqueous phase was rejected, and the organic phase was extracted with four lots of 8% aqueous sodium hydroxide solution, amounting to 700 parts by volume in all in order to separate the dihydroperoxide. The organic layer was next washed free from alkali and the benzene was driven off. The residue was diluted with three times its volume of light petroleum (B.P. 40–60° C.), and extracted several times with a total of 280 parts by volume of a mixture containing 57 parts by weight of sodium hydroxide and 140 parts by volume of methanol in water. By dilution with water and neutralisation with carbon dioxide, the extract yielded the monohydroperoxide. This was isolated by extraction with benzene, and after washing, drying, and evaporation of the solvent in vacuo it was obtained as a viscous liquid containing 92% of monohydroperoxide by titration. The 8% sodium hydroxide extracts were neutralised with carbon dioxide to liberate the dihydroperoxides, which precipitated as a solid and were removed by filtration and washed with water. Recrystallisation from chloroform of the mixed solid dihydroperoxide, which amounted to 27.6 parts by weight, afforded one stereoisomer, M.P. 149–150° C. which analysed 64.1% C; 7.1% H (calculated 64.2% C; 7.2% H). The other stereoisomer was obtained in an impure state by precipitating from the chloroform mother-liquors by addition of light petroleum and repeated recrystallisation from toluene and from benzene. It melted at approximately 90° C. and analysed 65.2% C; 7.3% H.

7.6 parts by weight of a mixture of the two isomers of the dihydroperoxide which was 91% pure dihydroperoxide were dissolved in 100 parts by volume of acetone and 0.25 part by weight of sulphuric acid was added. The solution was boiled under reflux for 30 minutes, by which time the peroxide had nearly all been consumed, and then the sulphuric acid was neutralised by agitating the solution with magnesium oxide. The mixture was filtered and the acetone driven off, and the product was dissolved in 50 parts by volume of benzene and extracted with water to separate the catechol produced. This was recovered by evaporating the water, finally in presence of benzene with which the water distilled as an azeotrope. The residue consisted of catechol and amounted to 3.6 parts by weight, which is the theoretical yield based on the dihydroperoxide. The benzene solution of the reaction mixture, after extracting the catechol, was distilled and gave 1.1 parts by weight of acetonylacetone.

246 parts by weight of the higher melting isomer of the dihydroperoxide (M.P. 150° C.) were decomposed with 12 parts by weight of sulphuric acid in 2500 parts by volume of acetone at the boiling point for 15 minutes. After neutralisation of the acid with magnesium oxide, the acetone was evaporated and replaced by carbon tetrachloride. By extraction of this solution with water, 90.1 parts by weight of catechol were obtained.

I claim:

1. Process of producing 1:4-dialkyl-1:2:3:4-tetrahydronaphthalene dihydroperoxides which comprises intimately contacting a 1:4-dialkyl-1:2:3:4-tetrahydronaphthalene in liquid phase with an oxygen-containing gas at a temperature between about 70° and about 120° C., said substituting alkyl groups being straight chain alkyl groups having 1–4 carbon atoms, thereby producing an oxidation reaction mixture containing a 1:4-dialkyl-1:2:3:4-tetrahydronaphthalene dihydroperoxide, a 1:4-dialkyl-1:2:3:4-tetrahydronaphthalene monohydroperoxide and unreacted 1:4-dialkyl-1:2:3:4-tetrahydronaphthalene, extracting said oxidation reaction mixture with an aqueous alkali metal hydroxide solution having a strength between 2 and 12% by weight, whereby the dihydroperoxide is selectively extracted into the aqueous alkali metal hydroxide solution, and recovering said dihydroperoxide from said aqueous alkali metal hydroxide solution.

2. The process of claim 1 wherein the aqueous alkali metal hydroxide solution has a strength between 7 and 9% by weight.

3. The process of claim 1 wherein the unreacted 1:4-dialkyl-1:2:3:4-tetrahydronaphthalene and the 1:4-dialkyl-1:2:3:4-tetrahydronaphthalene monohydroperoxide remaining after extraction of the oxidation reaction mixture with the aqueous alkali metal hydroxide solution are recycled to the oxidation stage.

4. The process of claim 1 wherein the 1:4-dialkyl-1:2:3:4-tetrahydronaphthalene is 1:4-dimethyl-1:2:3:4-tetrahydronaphthalene.

5. The process of claim 1 wherein the 1:4-dialkyl-1:2:3:4-tetrahydronaphthalene is 1:4-diethyl-1:2:3:4-tetrahydronaphthalene.

References Cited in the file of this patent

UNITED STATES PATENTS

| | | |
|---|---|---|
| 2,644,447 | Lorand et al. | Dec. 29, 1953 |
| 2,736,753 | Jacobs | Feb. 28, 1956 |
| 2,797,249 | Young | June 25, 1957 |
| 2,868,842 | Closson et al. | Jan. 13, 1959 |

OTHER REFERENCES

Larsen et al.: Ind. & Eng. Chem., vol. 34, pages 187, 188 (2 pages; entire article pages 183–193), February 1942.

Sisido et al.: Jour. Amer. Chem. Soc., vol. 70 (1948), page 1288 (1 page only).

Hock et al.: Chem. Abstracts, vol. 44, column 9945–48 (1950) (2 pages).